(12) United States Patent
Grethel et al.

(10) Patent No.: US 8,572,958 B2
(45) Date of Patent: Nov. 5, 2013

(54) HYDRAULIC ENERGY SOURCE FOR SUPPLYING A DOWNSTREAM HYDRAULIC SYSTEM WITH HYDRAULIC ENERGY

(75) Inventors: Marco Grethel, Buehlertal (DE); Martin Staudinger, Ettlingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 15 days.

(21) Appl. No.: 13/240,210

(22) Filed: Sep. 22, 2011

(65) Prior Publication Data

US 2012/0060488 A1   Mar. 15, 2012

Related U.S. Application Data

(63) Continuation of application No. PCT/DE2010/000473, filed on Apr. 26, 2010.

(30) Foreign Application Priority Data

May 6, 2009  (DE) .......................... 10 2009 019 877
Nov. 23, 2009  (DE) .......................... 10 2009 054 276

(51) Int. Cl.
  *F15B 21/04*  (2006.01)
  *F16H 57/04*  (2010.01)
(52) U.S. Cl.
  USPC ............................................. 60/435; 60/486
(58) Field of Classification Search
  USPC .......................................... 60/486, 489, 435
  See application file for complete search history.

(56) References Cited

U.S. PATENT DOCUMENTS

| 4,813,234 A * | 3/1989 | Nikolaus .......................... 60/484 |
| 6,973,782 B2 * | 12/2005 | Rose ................................. 60/414 |
| 2003/0047410 A1 * | 3/2003 | Busold et al. ................ 192/87.11 |
| 2009/0215585 A1 * | 8/2009 | Grethel et al. ................... 477/79 |

FOREIGN PATENT DOCUMENTS

| DE | 10 2004 058 261 A1 | 6/2006 |
| DE | 10 2008 009 653 A1 | 9/2008 |
| EP | 0 764 799 A1 | 3/1997 |
| EP | 1 602 849 A1 | 12/2005 |
| EP | 1602849 A1 * | 12/2005 |
| WO | 2008/055464 A2 | 5/2008 |
| WO | WO 2008055464 A2 * | 5/2008 |

* cited by examiner

*Primary Examiner* — Edward Look
*Assistant Examiner* — Logan Kraft
(74) *Attorney, Agent, or Firm* — Lucas & Mercanti, LLP

(57) ABSTRACT

A hydraulic energy source for supplying a downstream hydraulic system with hydraulic energy. In particular, a hydraulic system for controlling and/or cooling a transmission preferably a dual clutch transmission. The hydraulic energy source enables a first partial volume flow which is produced at a comparatively high system pressure and which is used to supply an actuator of the hydraulic system and a second partial volume flow which is produced at a comparatively low cooling pressure and which is used to cool the hydraulic system, to be produced The hydraulic energy source has an electrically driveable first volume flow source which is used to produce the first partial volume flow and a second volume flow source which is used to produce the second partial volume flow. The second volume flow source is drivingly connected independently of an internal combustion engine.

12 Claims, 8 Drawing Sheets

HYDRAULIC ENERGY SOURCE FOR SUPPLYING A DOWNSTREAM HYDRAULIC SYSTEM WITH HYDRAULIC ENERGY

CROSS-REFERENCE TO RELATED APPLICATIONS

This application is a Continuation Application of PCT/DE2010/000473 filed Apr. 26, 2010, which in turn claims the priority of DE 10 2009 019 877.6 filed May 6, 2009 and DE 10 2009 054 276.0 filed Nov. 23, 2009. The priority of these applications is hereby claimed and these applications are incorporated by reference herein.

FIELD OF THE INVENTION

The invention relates to a hydraulic energy source for supplying a downstream hydraulic system with hydraulic energy, in particular a hydraulic system for controlling and/or cooling a transmission, especially a dual clutch transmission. The hydraulic energy source enables the production of a first partial volume flow, which is at a comparatively high system pressure and which is used to supply an actuator system of the hydraulic system, and a second partial volume flow, which is at a comparatively low cooling pressure and which is used to supply a cooling system of the hydraulic system.

BACKGROUND OF THE INVENTION

Hydraulic energy sources for supplying a downstream hydraulic system with hydraulic energy are known.

In automatic transmissions, such as step-change automatic transmissions, continuously variable transmissions or dual clutch transmissions, with hydraulic control, i.e. actuator activation, such as clutch actuator or shift actuator control, and a cooling/lubricating oil supply, there is a need for an oil supply (generally a pump with a pump drive). In general, the pump drive is a mechanical pump drive, which is coupled to the internal combustion engine.

In modern transmissions, this mechanical pump drive can be supplemented by an electric pump arrangement (i.e. an electric motor with a pump).

The prior art also includes oil supply systems which manage without a mechanically driven pump for the transmission and clutch actuator systems. Here, however, there is no requirement for cooling oil owing to the construction of the clutch as a dry clutch.

If the intention is to dispense with a mechanical drive, especially in the case of wet clutches, all the hydraulic power required for this purpose must be provided by the electrically driven pump in the case of the known systems. However, there is great variety in the operating states which arise in this case. Thus, there are both situations involving a high volume-flow and a low pressure requirement and situations with a high pressure and a low volume-flow requirement. These completely different boundary conditions necessitate very large electric motors (costs, weight, load on the onboard electrical system) in the case of a conventional electric motor/pump arrangement (speed-controlled drive) in order to provide the different operating states in an oil supply system.

SUMMARY OF THE INVENTION

It is the object of the invention to provide an improved and/or an alternative hydraulic energy source for supplying a downstream hydraulic system with hydraulic energy, in particular a hydraulic system for controlling and/or cooling a transmission, especially a dual clutch transmission, and, in particular, to enable an energy-efficient supply and/or a supply which is optimized in terms of design.

This object is achieved, in the case of a hydraulic energy source the supplying a downstream hydraulic system with hydraulic energy, in particular a hydraulic system for controlling and/or cooling a transmission, especially a dual clutch transmission, said hydraulic energy source enabling the production of a first partial volume flow, which is at a comparatively high system pressure and which is used to supply an actuator system of the hydraulic system, and a second partial volume flow, which is at a comparatively low cooling pressure and which is used to supply a cooling system of the hydraulic system, by virtue of the fact that the hydraulic energy source has an electrically driveable or driven first volume flow source for producing the first partial volume flow and a second volume flow source for producing the second partial volume flow, the second volume flow source being independent of an internal combustion engine in terms of drive. The volume flow sources can advantageously be matched to a pressure and/or volume-flow requirement of the actuator system and the cooling system. The partial volume flows can vary, that is to say may even fall temporarily more or less to zero, depending on the requirements of the downstream actuator system or cooling system, with the system pressure, for example, being applied to the downstream actuator system. The term "volume flow source" can be taken to mean any arrangement for producing a volume flow, and division of the volume flow into two partial volume flows by means of downstream components or control may also be taken to entail two volume flow sources.

In one embodiment of the hydraulic energy source, provision is made to enable the first volume flow source to be driven by means of a first electric motor. The first volume flow source can advantageously be supplied with mechanical energy independently of another component, e.g. an internal combustion engine associated with the transmission.

In another embodiment of the hydraulic energy source, provision is made for the first volume flow source to have a first pump and the second volume flow source to have a second pump, a disengageable coupling enabling the second volume flow source to be either driven by means of the first electric motor or without drive. It is advantageously possible to connect up the second volume flow source to meet an increased cooling requirement.

In another embodiment of the hydraulic energy source, provision is made for the first electric motor to have a variable speed. By adapting a speed of the first electric motor, it is also advantageously possible to vary a corresponding volume flow driven thereby, that is to say to match it to a corresponding requirement of the downstream actuator system and/or cooling system, for example.

In another embodiment of the hydraulic energy source, provision is made to enable the first volume flow source to be associated either with the actuator system or with the cooling system by means of a downstream control valve. The first partial volume flow and the second partial volume flow can advantageously be produced by means of the first volume flow source, e.g. by pulsing. Moreover, it is possible to provide a pressure accumulator, in order to provide the system pressure for example when the second partial volume flow is being supplied.

In another embodiment of the hydraulic energy source, provision is made for a hydraulic energy accumulator to be associated with the actuator system. The energy accumulator can advantageously be used to provide storage and release of hydraulic energy, e.g. in order to cover pressure peaks, to shut down the hydraulic energy source temporarily and/or to split up a volume flow in order in this way to be able to obtain two volume flow sources with just one pump.

In another embodiment of the hydraulic energy source, provision is made for the first volume flow source and the second volume flow source to be implemented by means of a common pump, wherein, depending on a direction of rotation of the first electric motor, which is associated with the common pump by means of a speed-dependent transmission, the actuator system can be supplied with the first partial volume flow in a first operating position of the control valve and in a first direction of rotation of the first electric motor, and the cooling system can be supplied with the second partial volume flow in a second operating position of the control valve and in a second direction of rotation of the first electric motor. The directional transmission can advantageously have a different transmission ratio, depending on a direction of rotation, thus making it possible to obtain a low volume flow for supplying the system pressure and a high volume flow for supplying the cooling pressure, i.e. for supplying the cooling system, for example, depending on the direction of rotation, while requiring just one pump and one electric motor to achieve this. It may also be possible to time-multiplex an overall volume flow required from the pump, especially in combination with a hydraulic energy accumulator, in order in this way to produce the partial volume flows.

In another embodiment of the hydraulic energy source, provision is made for the second volume flow source to have a jet pump. By means of a jet-type source, it is advantageously possible to convert pressure energy into kinetic energy, a drop in pressure resulting in an increase in the volume flow, in order advantageously to supply a comparatively large volume flow at a comparatively low pressure for the cooling system, for example.

In another embodiment of the hydraulic energy source, provision is made for the first volume flow source to have a first pump flow of a multi-flow pump, and for the second volume flow source to have a second pump flow of the multi-flow pump. By means of the various pump flows of the multi-flow source, it is advantageously possible to produce the partial volume flows, it being possible, for example, to design the first pump flow for a comparatively low volume flow and the high system pressure and to design the second pump flow to be correspondingly larger, to give a high flow rate at a comparatively low cooling pressure.

In another embodiment of the hydraulic energy source, provision is made to enable the second volume flow source to be driven by means of a hydraulic motor arranged downstream of the first volume flow source. This arrangement advantageously represents a hydraulic transformer, which can transform a comparatively small volume flow which is at a high pressure into a comparatively large volume flow which is at a low pressure. This is an advantageous way of transforming the energy arising from the high system pressure into the comparatively large second partial volume flow, which is at the low cooling pressure, with maximum energy efficiency.

In another embodiment of the hydraulic energy source, provision is made for an accumulator charging valve to be arranged downstream of the first partial volume flow source. The shutoff valve can advantageously be used in combination with a pressure accumulator, thus enabling the first partial volume flow source to be decoupled by means of the shutoff valve where appropriate in order thereby to prevent an unwanted backflow into the first volume flow source.

In another embodiment of the hydraulic energy source, provision is made for the second electric motor to have a variable speed. The second electric motor can advantageously be used to vary the second partial volume flow.

In another embodiment of the hydraulic energy source, provision is made to enable the direction of rotation of the first electric motor to be varied. The first electric motor can advantageously be varied in one direction of rotation, thereby advantageously providing an adjustment facility for adjusting the first volume flow and the second volume flow.

In another embodiment of the hydraulic energy source, provision is made to enable the volume flow sources to be driven by means of the first electric motor, the first electric motor being associated with the first volume flow source by means of a first one-way clutch and with the second volume flow source by means of a second one-way clutch opposed to the first one-way clutch. It is advantageously possible to operate either the first volume flow source or the second volume flow source through a change in the direction of rotation of the first electric motor.

In another embodiment of the hydraulic energy source, provision is made to enable the first volume flow source to be driven by means of the first electric motor and the second volume flow source to be driven by means of a second electric motor. The electric motors can advantageously be activated differently, thereby advantageously enabling the volume flow sources to be adjusted to the requirements of the actuator system and the cooling system. Where appropriate, completely separate branches can be involved, each capable of being supplied with hydraulic energy by means of one of the volume flow sources.

The object is furthermore achieved in a transmission, in particular a dual clutch transmission, with a hydraulic system having a hydraulic energy source as described above. The advantages described above are achieved.

Further advantages, features and details will emerge from the following description, in which one embodiment is described in detail with reference to the drawing. Parts which are identical, similar and/or have the same functions are provided with the same reference signs. In the drawing:

DETAILED DESCRIPTION OF THE INVENTION

Figure 1:
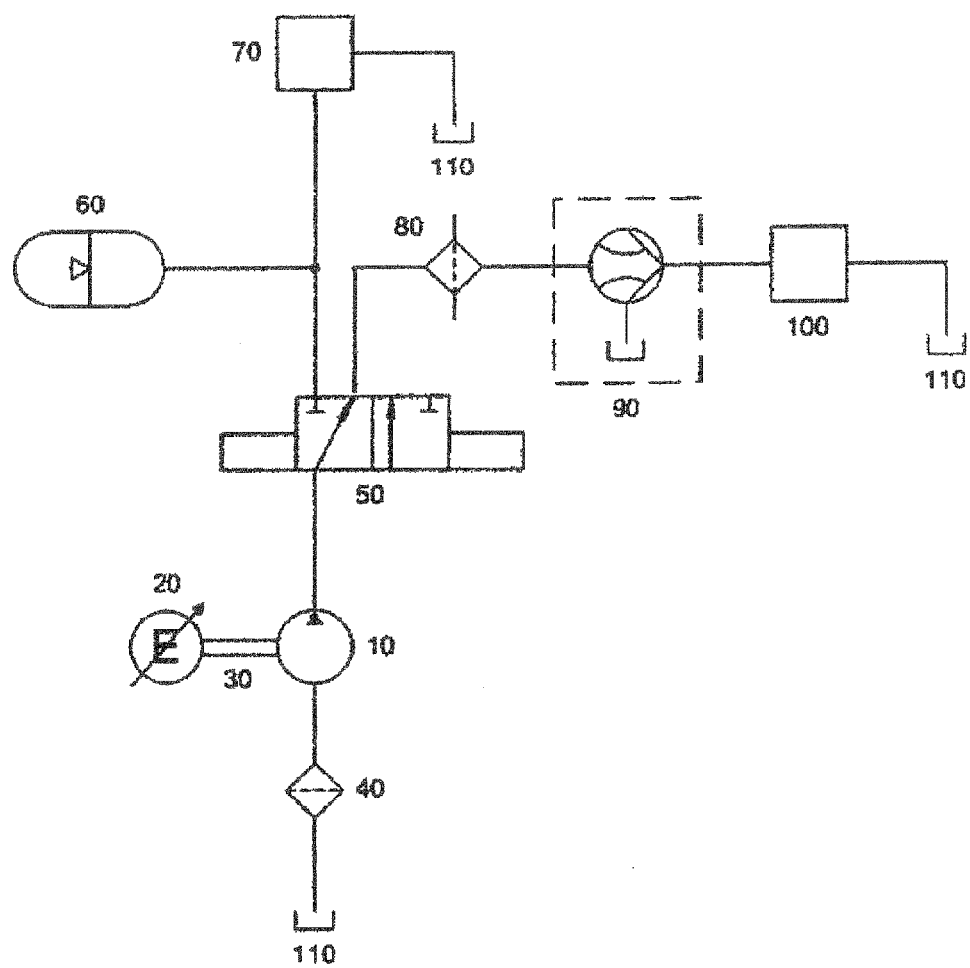
FIG. 1 shows a hydraulic energy source, which has a jet pump for supplying a cooling system.

FIG. 1 shows a hydraulic energy source for supplying an actuator system 70 and a cooling system 100 of a transmission, only part of which is shown, e.g. a dual clutch transmission with wet clutches, which can be cooled by means of the cooling system 100. The hydraulic energy source has a first electric motor 20, the speed of which is variable. The first electric motor 20 is associated with a first pump 10 by means of a drive connection 30. The first pump 10 is designed for a high pressure and a low pressure, e.g. a system pressure for supplying the actuator system 70 and a comparatively lower cooling pressure for supplying the cooling system 100. A suction filter 40 is arranged upstream of the first pump 10, and a tank 110 is arranged upstream of the suction filter 40. Arranged downstream of the first pump 10 is a selector valve 50, by means of which the first pump 10 can be either associated with the downstream actuator system 70 and the cooling system 100 or isolated therefrom. Arranged downstream of the selector valve 50 is a pressure accumulator 60, by means of which hydraulic energy, in particular hydraulic energy at the level of the system pressure for supplying the actuator system 70, can be stored. Arranged downstream of the selector valve 50, in two branches, is the actuator system 70 and, in another branch, an oil cooler 80 for cooling a hydraulic medium delivered from the tank 110, and arranged downstream of the oil cooler 80 is a jet pump 90.

Figure 2:
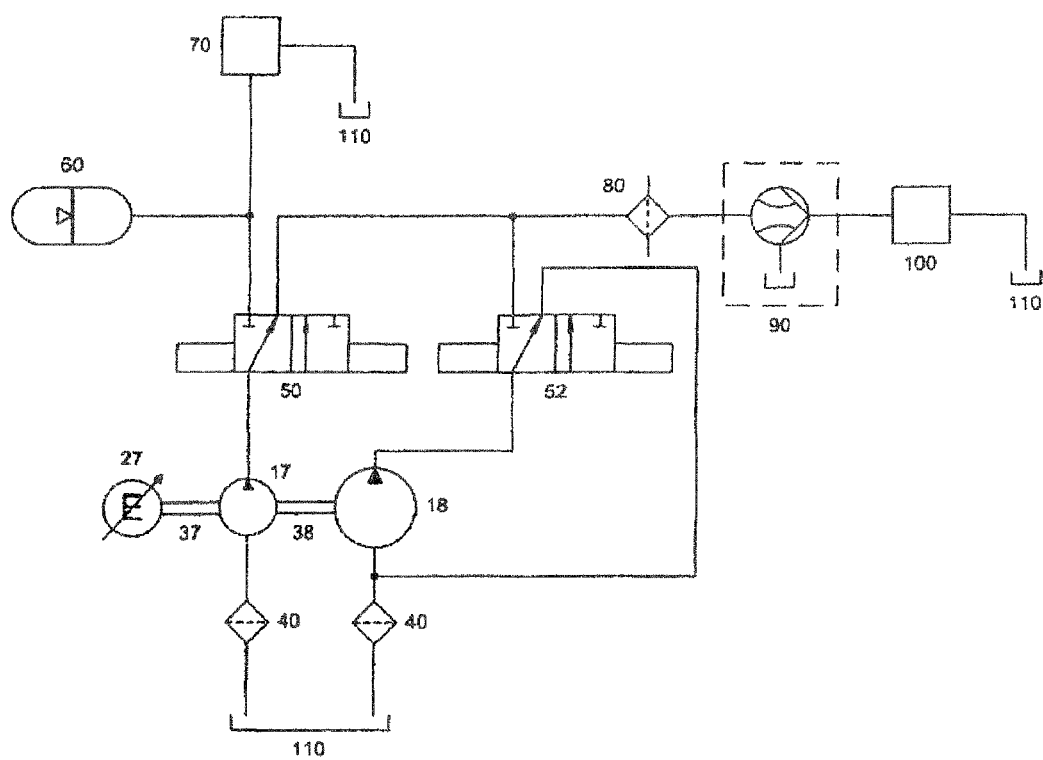
FIG. 2 shows another hydraulic energy source, which has a variable-speed electric motor, by means of which a multi-flow pump can be driven.

FIG. 2 shows another hydraulic energy source, which can likewise be driven by means of a first variable-speed electric motor 27. By way of a difference, two drive connections 37 and 38 are provided. By means of drive connection 37, the first electric motor 27 is coupled to a first pump 17 or pump flow. The first pump 17 or first pump flow of the first pump 17 is associated by means of drive connection 38 with a second pump flow of a second pump 18. The pumps 17 and 18 form a multi-flow pump, the first pump flow of the first pump 17 being made smaller than the second pump flow of the second pump 18. The first pump 17 is used to supply the actuator system 70. The second pump 18 is used to supply the cooling system 100. Arranged downstream of the second pump is a bypass valve 52, by means of which the second pump can be short-circuited or connected to the tank 110. When the cooling requirement of the cooling system 100 is comparatively low, the bypass valve 52 can advantageously be used to isolate the second pump from the cooling system 100.

In the hydraulic energy source shown in FIG. 2, the jet pump 90 is optional.

Figure 3:
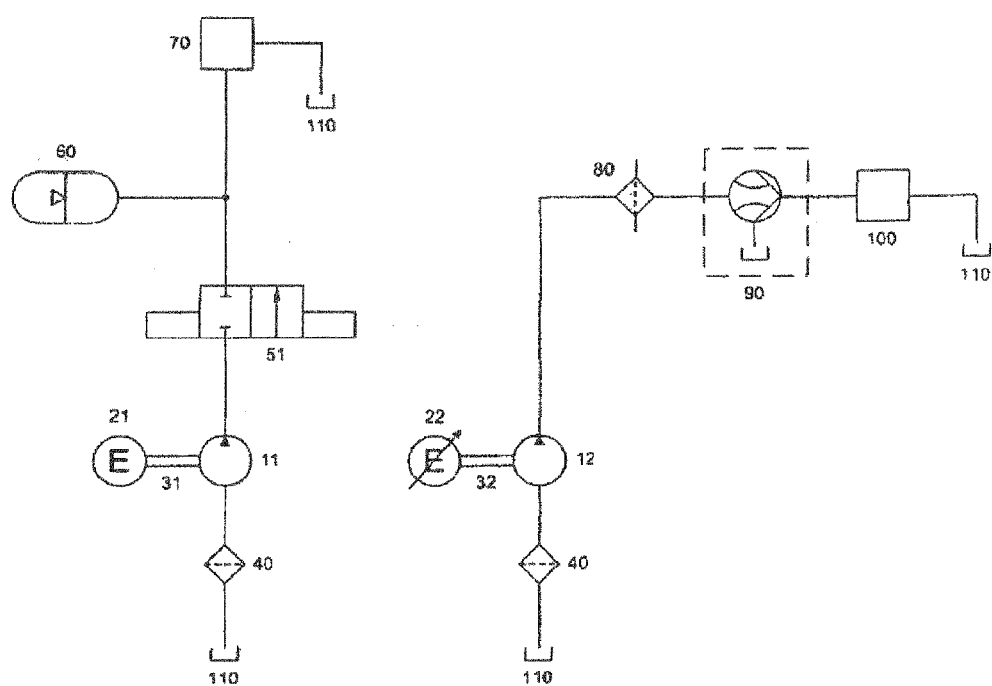
FIG. 3 shows another hydraulic energy source having a first electric motor and a second electric motor for supplying an actuator system and the cooling system.

FIG. 3 shows another hydraulic energy source, which, in contradistinction to the illustration in FIGS. 1 and 2, has a first electric motor 21 and a second electric motor 22, which supply completely independent branches for supplying the actuator system 70 and the cooling system 100 with hydraulic energy. For this purpose, the first electric motor 21 is associated with a first pump 11 by means of a drive connection 31, the first pump 11 being designed to produce a high pressure, i.e. the system pressure for supplying the actuator system, with a comparatively small first partial volume flow. The second electric motor 22 is associated with a second pump 12 by means of a drive connection 32. The second pump 12 is designed to produce a comparatively large second partial volume flow at the comparatively low cooling pressure for supplying the cooling system 100.

Arranged downstream of the first pump 11 is an accumulator charging valve 51, by means of which the pressure accumulator 60 and the actuator system 70 can either be isolated from the first pump 11 or associated therewith.

Arranged downstream of the second pump 12 are the oil cooler 80 and the jet pump 90. In the illustration according to FIG. 3, the jet pump 90 is optional. To allow variable driving of the second pump 12, the second electric motor 22 furthermore has a variable speed, advantageously allowing the cooling system 100 to be supplied as required for cooling with the hydraulic medium.

Figure 4:
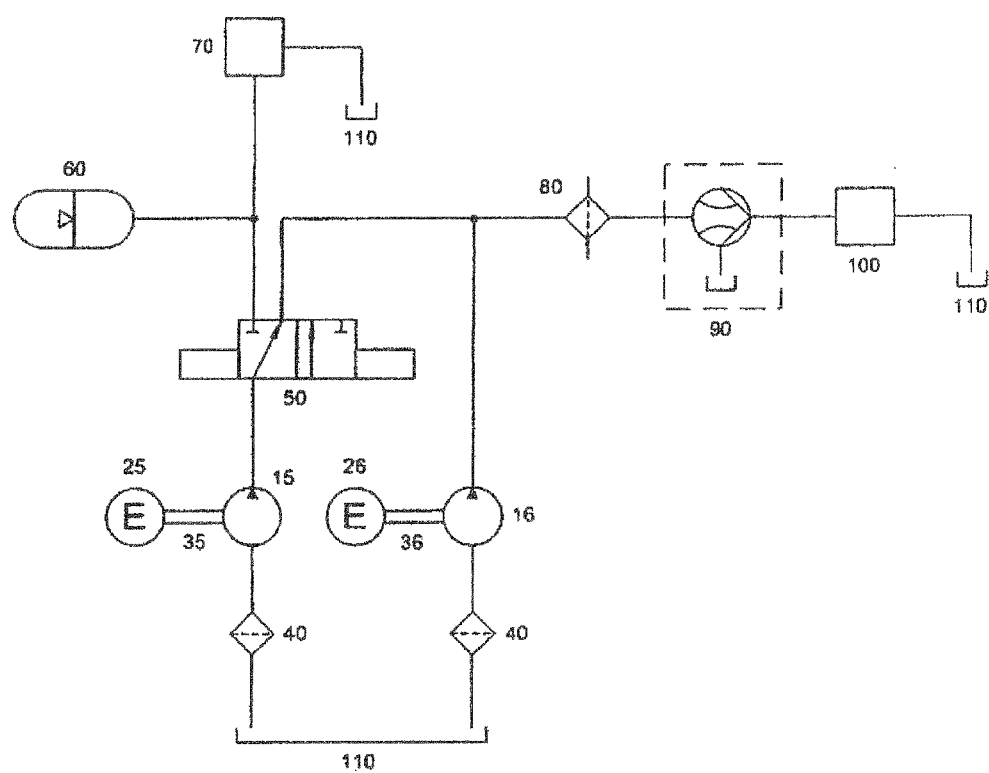
FIG. 4 shows a hydraulic energy source similar to that shown in FIG. 3, the difference being that a control valve for supplying either the actuator system or the cooling system is arranged downstream of a pump associated with the first electric motor.

FIG. 4 shows another hydraulic energy source, which has a first electric motor 25 and a second electric motor 26. The first electric motor 25 is associated by means of a drive connection 35 with a first pump 15 for producing the first partial volume flow for supplying the actuator system 70. The second electric motor 26 is associated by means of a drive connection 36 with a second pump 16 for producing the second partial volume flow for supplying or cooling the cooling system 100. The selector valve 50 is associated with the first pump 15, and therefore said pump can likewise be used to supply the cooling system. The first pump 15 can be made smaller than the second pump 16.

The jet pump 19 illustrated in FIG. 4 is optional.

Figure 5:
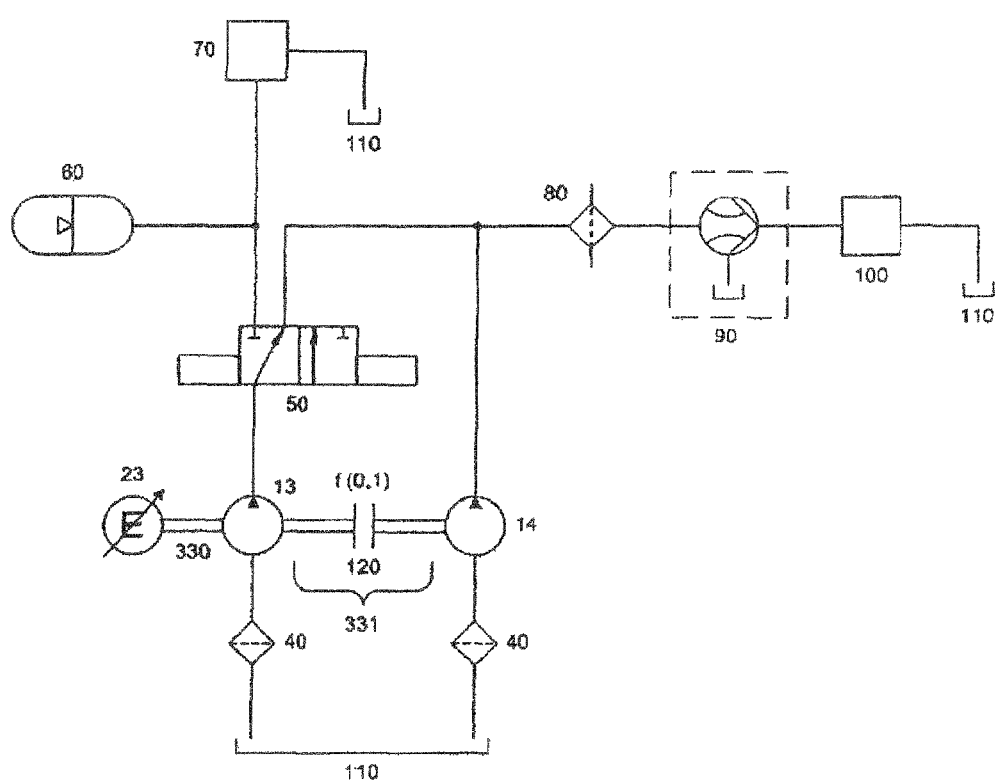
FIG. 5 shows a hydraulic energy source similar to that illustrated in FIG. 4, the difference being that only one electric motor is provided, which drives two pumps, it being possible for a second pump to be isolated by means of a clutch.

FIG. 5 shows another hydraulic energy source having a first electric motor 23 that has a variable speed. The first electric motor 23 is associated by means of a drive connection 330 with a first pump 13 for supplying the actuator system 70 with the first partial volume flow at the system pressure. The first pump 13 is associated with a second pump 14 by means of a disengageable drive connection 331. The second pump 14 is made larger than the first pump 13 and is used to produce the second partial volume flow at the lower cooling pressure for supplying the cooling system 100. The selector valve 50 is arranged downstream of the first pump 13.

The disengageable drive connection 331 has a disengageable coupling. A corresponding control system for operating the disengageable coupling 120 is not shown specifically in FIG. 5. The disengageable coupling 120 advantageously enables the second pump 14 to be optionally associated with the first variable-speed electric motor 23. The second pump 14 can advantageously be connected up as required, thus for example when the cooling system 100 has an increased cooling requirement. If the cooling system 100 does not have a volume flow or cooling requirement, the second pump 14 can be decoupled from the first electric motor 23 by means of the disengageable coupling 120 of the drive connection 331.

The jet pump 90 illustrated in FIG. 5 is optional.

Figure 6:
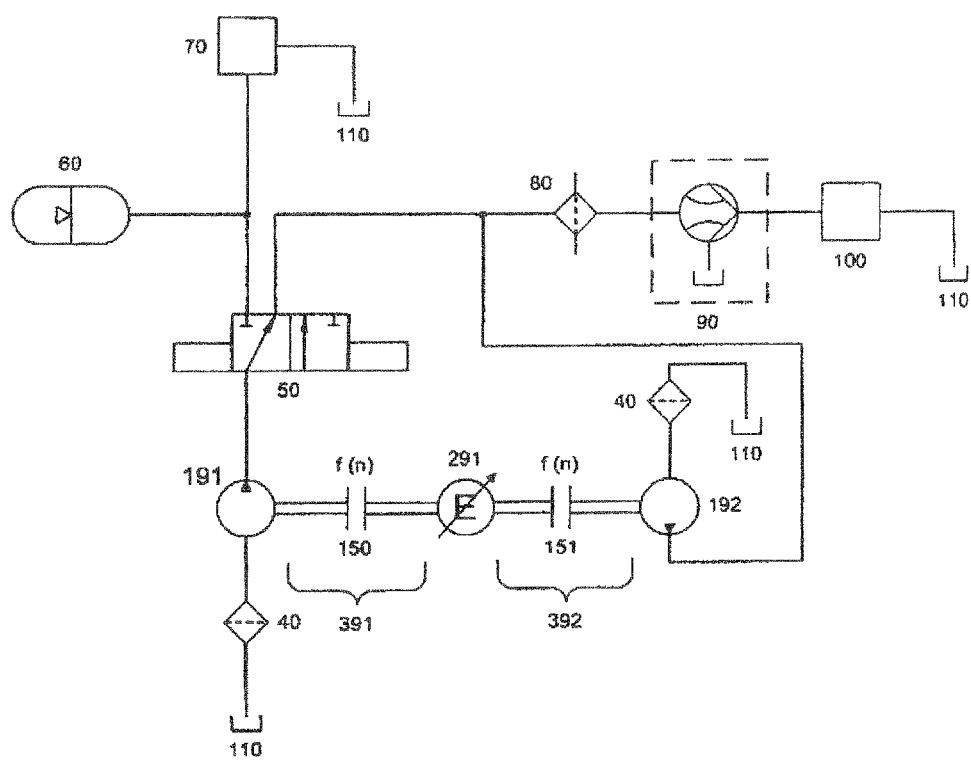
FIG. 6 shows a hydraulic energy source similar to that illustrated in FIG. 5, the difference being that the electric motor is directional and is associated with two pumps by means of two opposed one-way clutches.

FIG. 6 shows another hydraulic energy source having a first electric motor 291. The first electric motor 291 has a variable speed and is associated with a first pump 191 by means of a directional drive connection 391 and with a second pump 192 by means of a directional drive connection 392. The first pump 191 is made smaller than the second pump 192. Directional drive connection 391 has a one-way clutch 150 arranged between the first pump 191 and the first electric motor 291. Directional drive connection 392 has a one-way clutch arranged between the first electric motor 291 and the second pump 192. The one-way clutches 150 and 151 are opposed, with the result that only the first pump 191 is driven in a first direction of rotation of the first electric motor 291 and only the second pump 192 is driven in a second direction of rotation. It is advantageously possible, by choosing the direction of rotation of the first electric motor 291, to control whether only the first pump 191 or only the second pump 192 delivers or is driven. The selector valve 50 is arranged downstream of the first pump 191. The oil cooler 80, the jet pump 90 and the cooling system 100 are arranged downstream of the second pump 192.

The jet pump 90 illustrated in FIG. 6 is optional.

Figure 7:
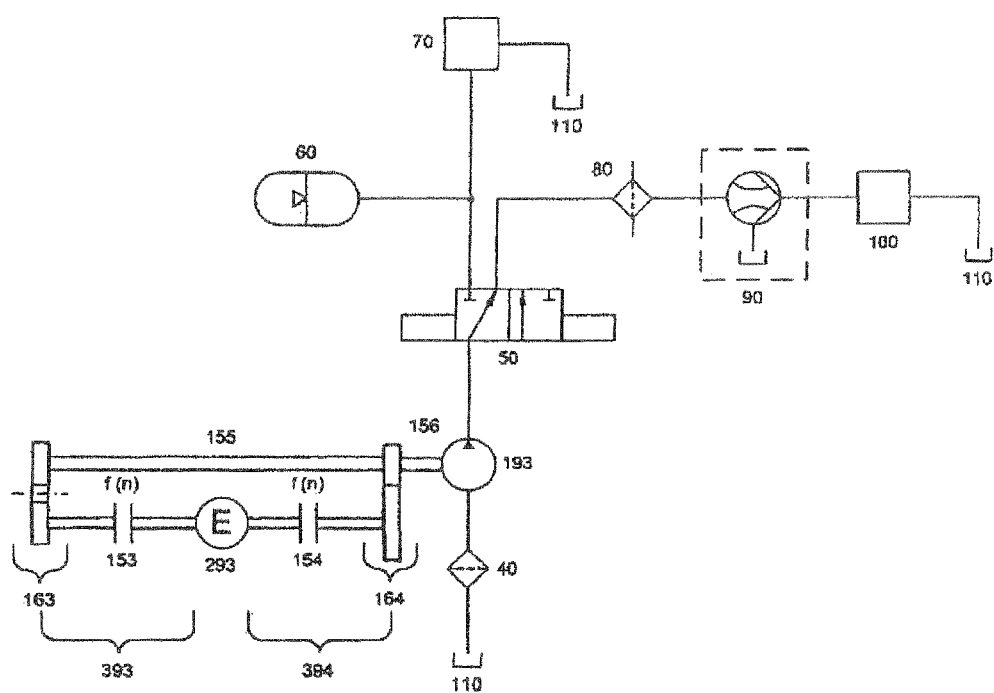
FIG. 7 shows another hydraulic energy source having an electric motor and a pump, the electric motor being directional and being associated with the pump by means of a directional transmission.

FIG. 7 shows another hydraulic energy source having a first pump 193. The first pump 193 is associated by means of a drive connection 156 with a directional transmission 155. The transmission 155 has a first gear stage 163 and a second gear stage 164.

A first electric motor 293 is associated with the first gear stage 163 by means of a first directional drive connection 393. The first electric motor 293 is associated with the second gear stage 164 by means of a second directional drive connection 394. The first drive connection 393 has a first one-way clutch 153. The second drive connection 394 has a second one-way clutch 154. The first 153 and the second one-way clutch 154 are opposed, with the result that either the first gear stage 163 or the second gear stage 164 is driven, depending on a direction of rotation of the first electric motor 293, for which purpose the first electric motor 293 is of speed-dependent design. The first gear stage 163 has three gearwheels and a transmission ratio of approximately 1 to 1. The second gear stage 164 has two gearwheels and brings about a speed increase. It is apparent that different speeds are obtained at the first pump 193 for the same speed of the first electric motor 293, depending on the direction of rotation of the first electric motor 293. In this way, it is advantageously possible, simply by choosing the direction of rotation of the first electric motor 293, to set a larger or smaller volume flow at the first pump 193.

The selector valve 50 is arranged downstream of the first pump 193. It is advantageously possible, depending on the direction of rotation of the first electric motor 293, to provide either a comparatively small first partial volume flow at the high system pressure in order to supply the actuator system 70 or to provide a comparatively large second partial volume flow at the comparatively low cooling pressure in order to supply the cooling system 100.

The jet pump illustrated in FIG. 7 is optional.

Figure 8:
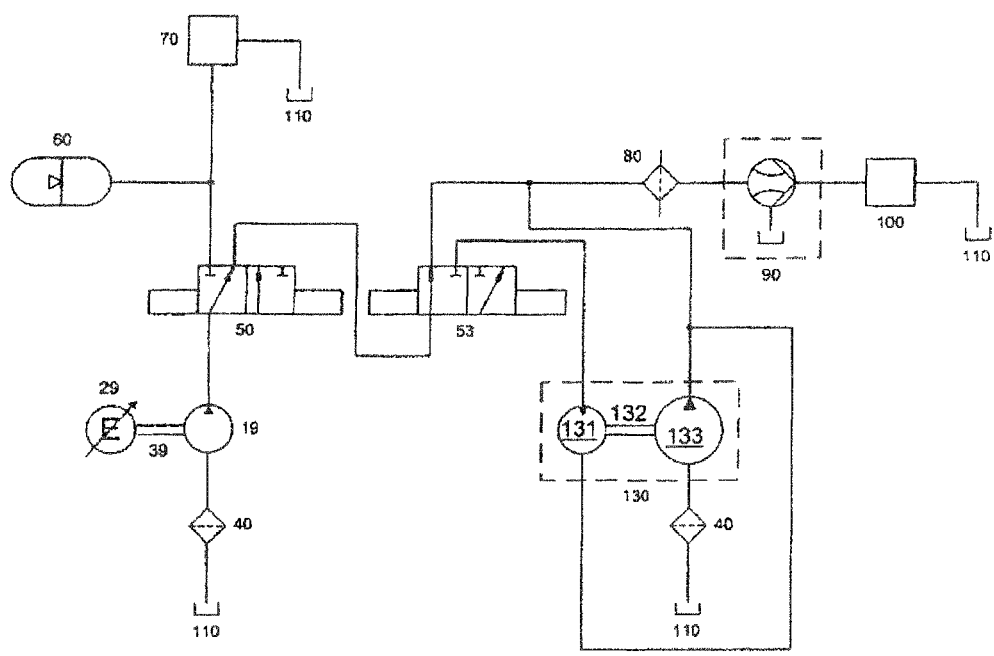
FIG. 8 shows another hydraulic energy source having an electric motor and a pump associated therewith, and a hydraulic motor arranged downstream of the pump for the purpose of driving another pump in order to supply the cooling system.

FIG. 8 shows another hydraulic energy source having a first electric motor 29, which is of variable-speed design. The first electric motor 29 is associated with a first pump 19 by means of a drive connection 39. The first pump 19 can be made comparatively small in order to produce the comparatively high system pressure with a comparatively low first partial volume flow. The selector valve 50 is arranged downstream of the first pump 19. Arranged downstream of the selector valve 50 is another selector valve 53, which associates selector valve 50 either with the cooling system 100 or with a hydraulic motor of a hydraulic transformer 130. The hydraulic motor of the hydraulic transformer 130 is associated with a second pump 130 by means of a drive connection, it being possible to drive the second pump 133 by means of the hydraulic motor 131 via the drive connection 132. By means of the hydraulic transformer 130, it is advantageously possible to transform the first partial volume flow, which is at the high system pressure, into the second partial volume flow, which is at the comparatively low cooling pressure and is larger than the first partial volume flow.

The jet pump 90 shown in FIG. 8 is optional.

FIG. 1 shows a speed-controlled electric drive with the jet pump 19 for the cooling function of the cooling system 100, and it is advantageously possible to reduce the size of the first pump 10 and hence the torque at higher pressures.

FIG. 2 shows a speed-controlled electric drive with the multi-flow pump and the optional suction jet pump 90. It is advantageous that only the first pump 17 for producing the high system pressure has to be driven by the first electric motor 27.

By means of the first electric motor 21 and the second speed-controlled motor 22, the hydraulic energy source in FIG. 3 allows two completely independent branches for supplying the actuator system and the cooling system 100. According to FIG. 4, coupling between the branches can be provided by means of the selector valve 50.

FIG. 5 shows a hydraulic energy source with a speed-controlled first electric motor, which is associated with the pumps 13 and 14. The second pump 14, which is of larger design, can be connected up by means of the disengageable coupling.

FIG. 6 shows a hydraulic energy source having a first electric motor, which has a variable speed and a variable direction of rotation, with for the smaller first pump 191, which is designed to produce a the high system pressure and the low cooling pressure, and for a for the second, larger pump 192, which is designed to produce the lower cooling pressure. The one-way clutches 150 and 151 are built in to the drive connections 391 and 392 between the first electric motor and corresponding pump shafts, with the result that the smaller, first pump is driven in a first direction of rotation and the larger, second pump 192 is driven in a second direction of rotation. As an alternative, it is possible to pass the mechanical power flow through one of the pumps 191 or 192 and to provide an opposed one-way clutch at the end of the first pump 191.

FIG. 7 shows a hydraulic energy source which has the first electric motor 293, the direction of rotation of which is variable, and a transmission 155, the direction of rotation of which is variable.

FIG. 8 shows a hydraulic energy source with a variable-speed first electric motor 29, which with a first pump 19 designed for a high pressure and a low pressure and with the hydraulic transformer 130 to provide large cooling rates.

List of Reference Signs

| | |
|---|---|
| 10, 11, 13, 15, 17, 191, 193, 19 | First Pump |
| 12, 14, 16, 18, 192, 130, 133 | Second Pump |
| 50 | Selector Valve |
| 70 | Actuator System |
| 19, 90 | Jet Pump |
| 20, 21, 22, 23, 25, 26, 27, 291, 293, 29 | Electric Motor |
| 31, 32, 35, 36, 37, 38, 330, 331, 391, 392, 156, 393, 394, 39, 132 | Drive Connections |
| 40 | Suction Filter |
| 50, 53 | Selector Valve |
| 51 | Accumulator Charging Valve |
| 52 | Bypass Valve |
| 60 | Pressure Accumulator |
| 80 | Oil Cooler |
| 100 | Cooling System |
| 110 | Tank |
| 120 | Coupling |
| 130 | Hydraulic Transformer |
| 131 | Hydraulic Motor |
| 150, 151, 153, 154 | One-Way Clutch |
| 155 | Transmission |
| 163 | First Gear Stage |
| 164 | Second Gear Stage |

The invention claimed is:

1. A hydraulic energy source for supplying a downstream hydraulic system with hydraulic energy, said hydraulic energy source enabling production of a first partial volume flow, which is at a comparatively high system pressure and which is used to supply an actuator system of the hydraulic system, and a second partial volume flow, which is at a comparatively low system pressure and which is used to supply a cooling system of the hydraulic system, the hydraulic energy source, comprising:

an electrically driveable first volume flow source for producing the first partial volume flow; and a second volume flow source for producing the second partial volume flow, the second volume flow source being independent of an internal combustion engine in terms of drive, the second volume flow source comprising a jet pump disposed downstream of an oil cooler and upstream of the cooling system.

2. The hydraulic energy source as claimed in claim 1, wherein the first volume flow source is driven by a first electric motor.

3. The hydraulic energy source as claimed in claim 2, wherein the first electric motor has a variable speed.

4. The hydraulic energy source as claimed in claim 2, further comprising a common first pump and a speed-dependent transmission, wherein the first volume flow source and the second volume flow source are implemented by the common first pump, and wherein, depending on a direction of rotation of the first electric motor, which is associated with the common first pump by the speed-dependent transmission, the actuator system can be supplied with the first partial volume flow in a first operating position of the selector valve and in a first direction of rotation of the first electric motor, and the cooling system can be supplied with the second partial volume flow in a second operating position of the selector valve and in a second direction of rotation of the first electric motor.

5. The hydraulic energy source as claimed in claim 1, further comprising a disengageable coupling, wherein the first volume flow source has a first pump and the second volume flow source has a second pump, and the disengageable coupling-enables the second volume flow source to be either driven by the first electric motor or without drive.

6. The hydraulic energy source as claimed in claim 1, further comprising a downstream selector valve, and the first volume flow source being associated with the actuator system or with the cooling system by the downstream selector valve.

7. The hydraulic energy source as claimed in claim 1, further comprising a hydraulic energy accumulator, which is associated with the actuator system.

8. The hydraulic energy source as claimed in claim 1, wherein the first volume flow source has a first pump flow of a multi-flow pump, and the second volume flow source has a second pump flow of the multi-flow pump.

9. The hydraulic energy source as claimed in claim 1, further comprising a hydraulic motor arranged downstream of the first volume flow source, and the second volume flow source being driven by the hydraulic motor.

10. The hydraulic energy source as claimed in claim 1, wherein the hydraulic system controls and/or cools a transmission.

11. The hydraulic energy source as claimed in claim 10, wherein the transmission is a dual clutch transmission.

12. The hydraulic energy source as claimed in claim 1, wherein the second volume flow source further includes a pump arranged upstream of the oil cooler.

* * * * *